US007204027B2

(12) United States Patent
Tacklind

(10) Patent No.: US 7,204,027 B2
(45) Date of Patent: Apr. 17, 2007

(54) METHOD AND APPARATUS FOR DETERMINING REFERENCE LEVELS AND FLATNESS OF A SURFACE

(75) Inventor: Christopher A. Tacklind, Palo Alto, CA (US)

(73) Assignee: Robotoolz, Ltd., Kwun Tong, Kowloon (HK)

( * ) Notice: Subject to any disclaimer, the term of this patent is extended or adjusted under 35 U.S.C. 154(b) by 0 days.

(21) Appl. No.: 11/058,707

(22) Filed: Feb. 15, 2005

(65) Prior Publication Data
US 2006/0179672 A1 Aug. 17, 2006

(51) Int. Cl.
G01C 9/12 (2006.01)
(52) U.S. Cl. .......................................... 33/286; 33/291
(58) Field of Classification Search .................. 33/286, 33/291
See application file for complete search history.

(56) References Cited
U.S. PATENT DOCUMENTS 3,117,480 A * 1/1964 Peddinghaus ................ 33/286
5,864,956 A * 2/1999 Dong ........................... 33/227
6,459,483 B1   10/2002 Shafer et al.
6,542,304 B2   4/2003 Tacklind et al.
6,591,510 B2   7/2003 Tacklind
6,625,895 B2   9/2003 Tacklind et al.
6,657,788 B2   12/2003 Tacklind et al.
6,741,343 B2   5/2004 Shafer et al.
6,804,892 B1   10/2004 Yung et al.
6,964,106 B2 * 11/2005 Sergyeyenko et al. ........ 33/286

* cited by examiner

Primary Examiner—Christopher W. Fulton
(74) Attorney, Agent, or Firm—Greer, Burns & Crain, Ltd.

(57) ABSTRACT

A method and apparatus are presented for a laser tool used for direct indication of a level surface. This embodiment may also be used to transfer a level elevation from one level surface to a neighboring surface. The device may also be used to indicate the degree of flatness of a surface by direct observation. An alternative embodiment can provide a direct indication of plumb surfaces.

18 Claims, 12 Drawing Sheets

METHOD AND APPARATUS FOR DETERMINING REFERENCE LEVELS AND FLATNESS OF A SURFACE

BACKGROUND OF THE INVENTION

The present invention generally relates to the use of lasers in construction and other fields.

Level and plumb references are often needed in construction and other fields, and are traditionally determined with spirit levels. For long distances, auto levels and water levels have traditionally been used. More recently, these tasks are now being done with laser products. Automatically leveling laser products are preferred for their ease of set up and use.

The most common type of laser level device generates a spinning beam of laser light. A beam of light emanating from the device produces a spot on an impinged surface. But if the beam is swept, the eye perceives a line on the surface. A line is generated on any flat surface anywhere in the plane of the light. To increase the brightness on a surface, the beam my be tightly dithered back and forth in one angular range. Such devices may be manually or automatically leveled.

Increasingly common are line generators, which use a cylindrical lens or other element to generate a plane of laser light. The angular spread of light may be 90 degrees or more. Multiple fans may be aligned in a common plane to generate a full 360 degree plane of light. When this plane of light impinges on a surface, a sharp line is visible.

In generally all of these devices, the laser is offset from the base of the unit, and the laser unit can be adjusted in height using shims or a costly elevating stage. Most often, the offset value is determined and compensated for as needed. For example, to determine the correct vertical position for installing a new countertop at another location in a room, a self leveling pointing device can be placed on an existing counter top and positioned to shoot across a room. The offset of the beam up from the counter top is determined, and the beam is positioned to hit the wall where needed. A mark is then made on the wall at the beam, and the offset below the beam can then be measured to mark the true position of the new counter top.

The offset value must be explicitly handled in each case. For example, to level a countertop, a pointer device can be placed in one corner of it. The height of the beam near the unit is noted on a target or a tape measure as the target. Then the target is moved to a far corner and the target is moved back and forth to find the beam. The height is measured on the target at the new position. The difference between the two readings is the error in level of the counter. If the counter top is bowed, multiple readings must be taken. During the tedious process of shimming, the readings must be repeated at multiple points and in multiple directions and or along several axes. A similar process can be used with line generators and spinning lasers.

As a further example, the flatness of a surface can be checked by positioning a laser beam or plane next to a surface. Multiple height or offset measurements can be made at various points covering the surface, which is a tedious and error prone process.

SUMMARY OF THE INVENTION

Embodiments of the invention include an apparatus for providing a visual indication of the level characteristics and flatness of a surface and comprises a housing, a laser generating assembly for emitting a pair of fans of light that are oriented in a V shaped configuration with the bottom of V being located at a predetermined position relative to the subject surface and a self-leveling mechanism in the housing for controlling the laser generating assembly so that said fans of light produce lines on the subject surface that are parallel to one another and preferably appear as a single line when the subject surface is level and flat. A method of using a laser device is disclosed to directly transfer the horizontal elevation of a surface to another location in a room without having compensate for any offset.

DETAILED DESCRIPTION OF THE PREFERRED EMBODIMENTS

Embodiments of the present invention are useful to perform several important tasks that are important in the building and home improvement trades, in addition to related tasks in other arts. The embodiments described in this patent can easily transfer heights across a room, level surfaces such as countertops and the like and determine the flatness of a surface. These tasks can be done efficiently and accurately using various preferred embodiments of the present invention. These embodiments utilize many known components of laser technology, but by virtue of their elegant design, produce visual indicia that represents topographically accurate information of the surface which is being examined. Stated in other words, the displayed lines, i.e., the lines resulting from the laser beams impinging on the surfaces on which they are projected, provide visually intuitive information that represents the shape of the surface being examined.

Figure 1:
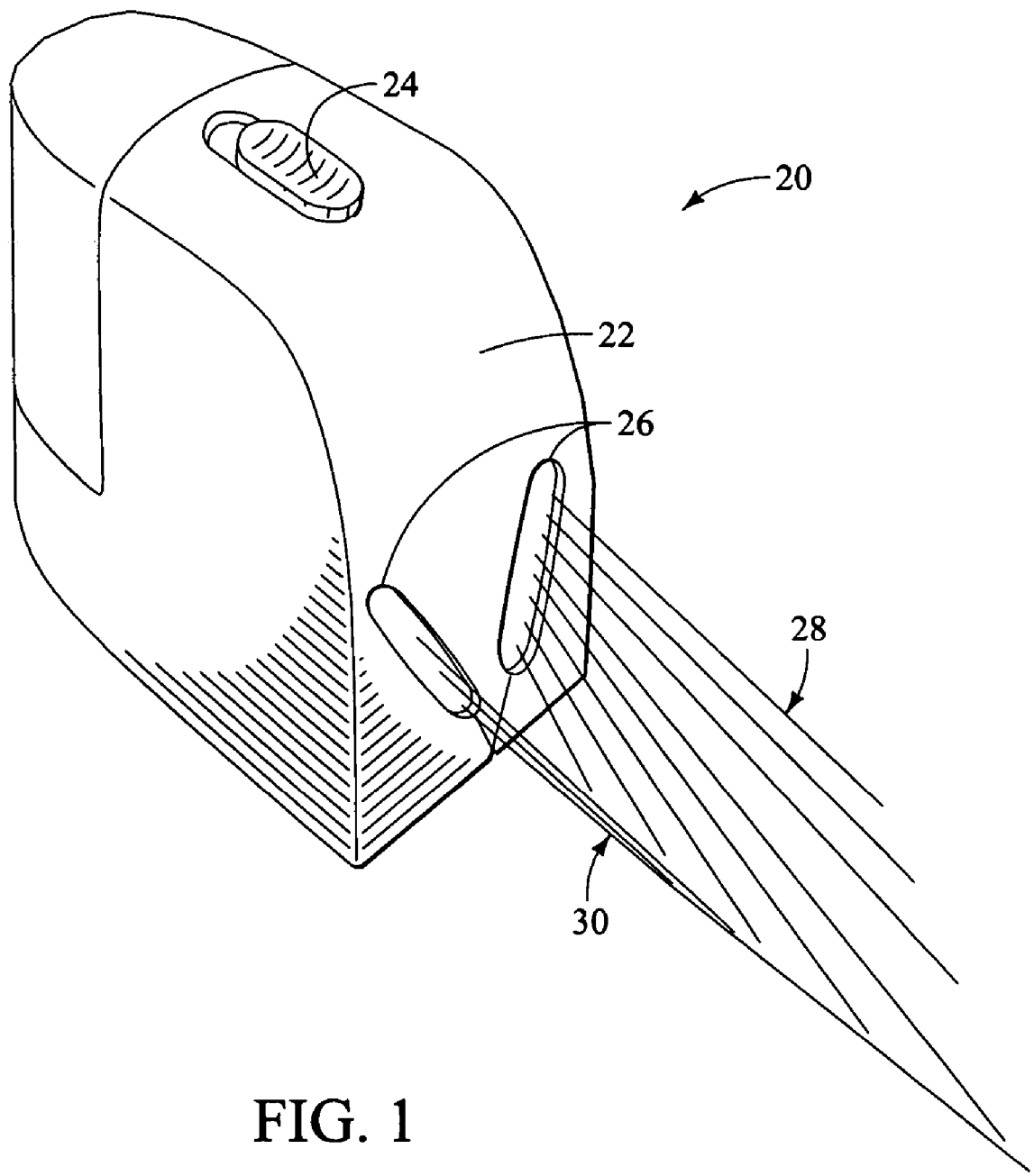
FIG. 1 is a left front perspective view of a first preferred embodiment of the invention for level applications.

Referring to the drawings and particularly FIG. 1, apparatus or device, indicated generally at 20, has a housing 22 that is preferably formed from a plastic or similar material and has an on/off switch 24 and two openings 26 through which laser beams in the form of fans 28 and 30 are projected. The openings 26 are in a preferred V-shaped configuration, which correspond to permit similarly configured fans of generated beams 28 and 30 to emerge substantially unobstructed.

Figure 2:
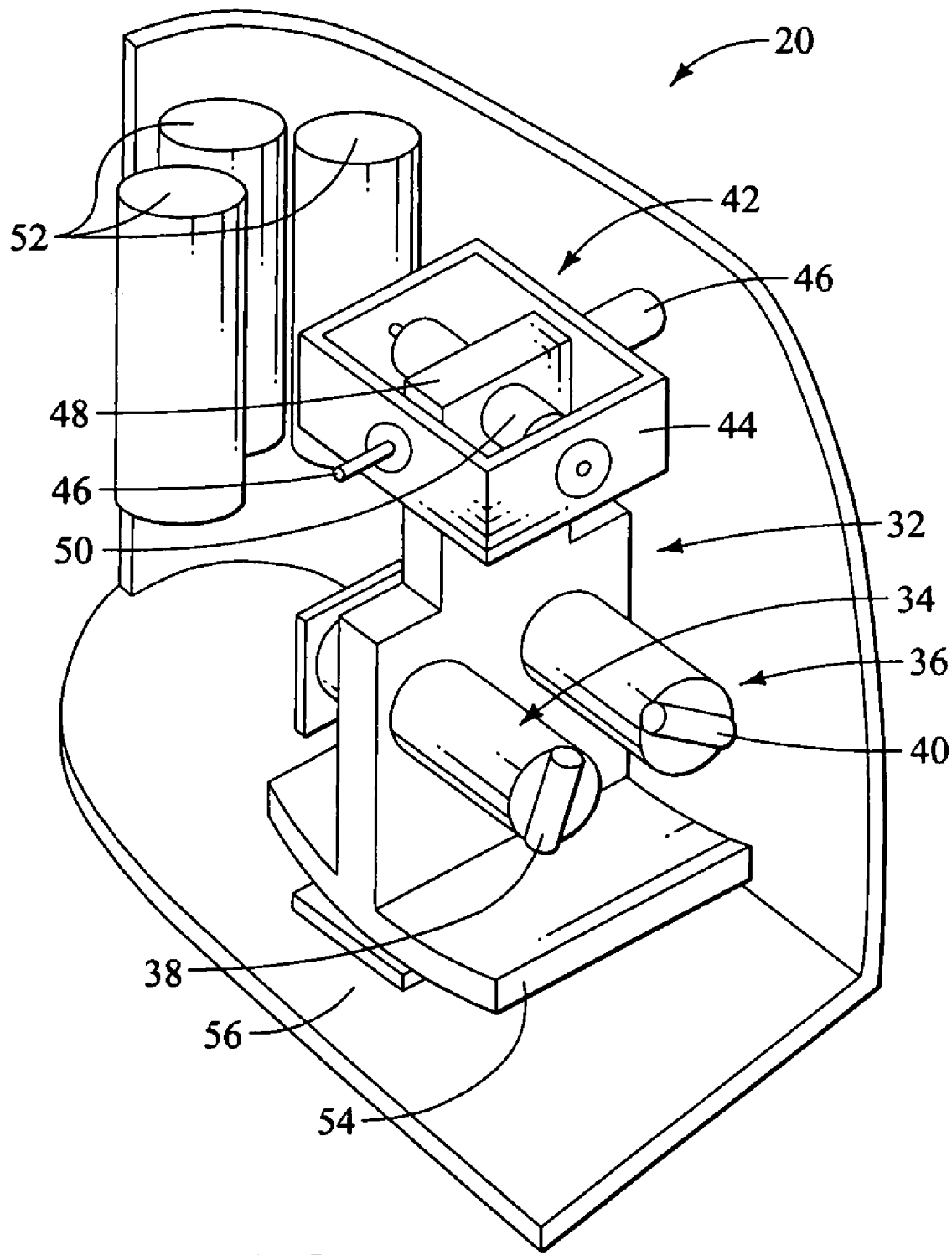
FIG. 2 is a cut away view of the embodiment shown in FIG. 1 showing a pendulum assembly with two line generating lasers.

The internal construction of the apparatus shown in FIG. 1 is shown in the cut away view of the device 20 of FIG. 2, which includes a self-leveling pendulum assembly, indicated generally at 32, which has two line generating lasers 34 and 36. The line generating lasers form fans of light through the use of cylindrical lenses 38 and 40 as is known in the art. The generated fans of light 28, 30 have a brightness characteristic that varies with emitted angle and a distribution that is typically Gaussian. Other extruded profiles can be used to produce more desired power profiles if desired.

Figure 3:
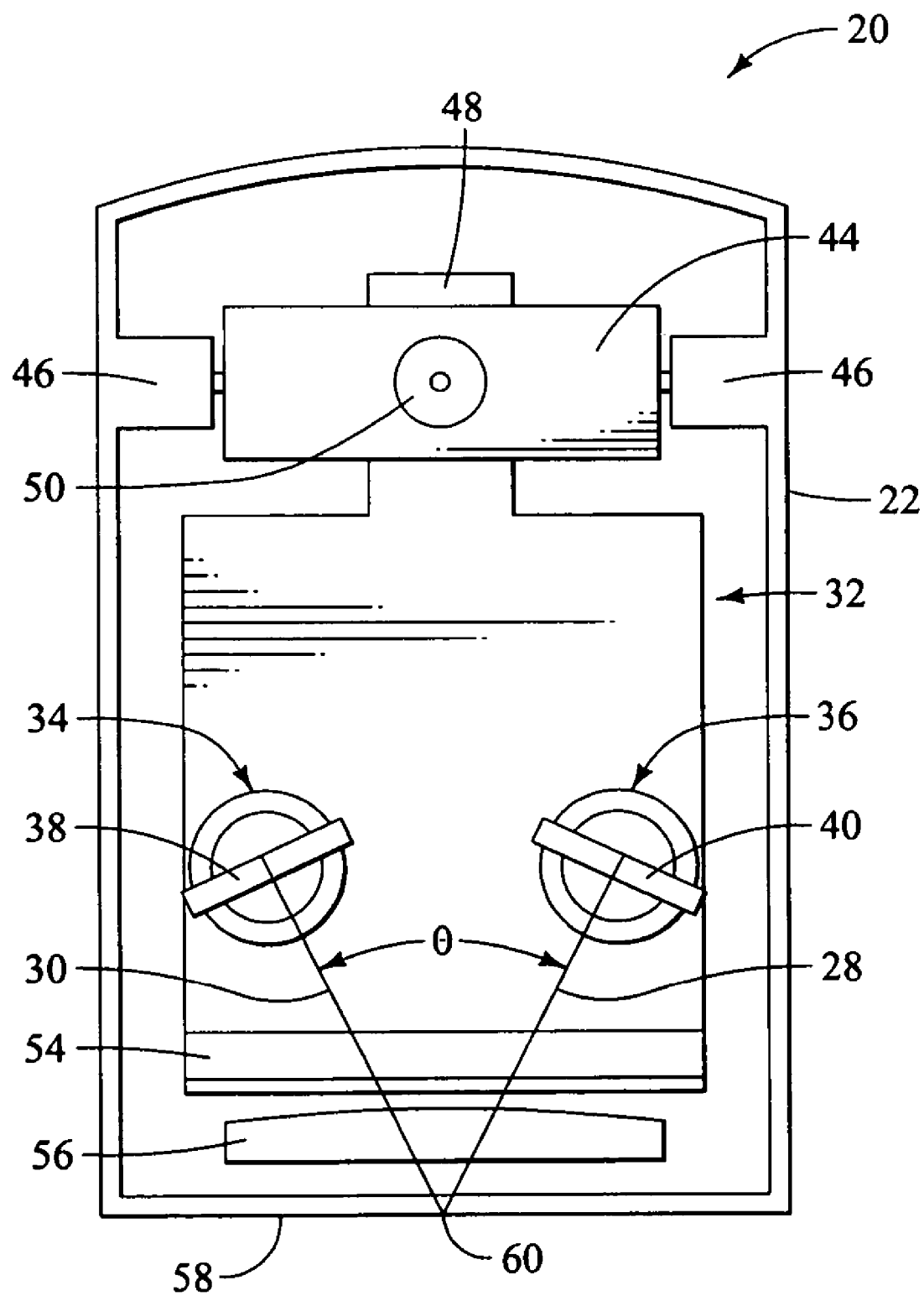
FIG. 3 is a front view of the embodiment shown in FIGS. 1 and 2.

While the self-leveling pendulum assembly 32 is preferred because of its simplicity, effectiveness and relatively low cost, other more exotic technology is available, such as that disclosed in U.S. Pat. No. 6,625,895 and can be a part of other embodiments of the present invention. The pendulum assembly 32 is supported by a gimbaled assembly 42 that allows freedom of motion in preferably two coordinate directions. In the illustrations of FIGS. 2 and 3, a rectangular frame 44 is pivotable on supports 46 that are mounted to the housing 22 and an upper end 48 of the pendulum assembly 32 is pivotable on a cylindrical support 50 that is oriented at a right angle relative to the support 46. Batteries 52 and support electronics (not shown) are also provided in the housing. A damping plate portion 54 located at the bottom of the pendulum assembly 32 is positioned in proximity to a magnet 56 to control oscillatory motion as is known to those of ordinary skill in the art. As best shown in FIG. 3, the cylindrical lenses 38 and 40 are oriented to produce the two planes of light 28 and 30 so that they intersect one another at the bottom preferably flat surface 58 of the device 20 at point 60.

Figure 4:
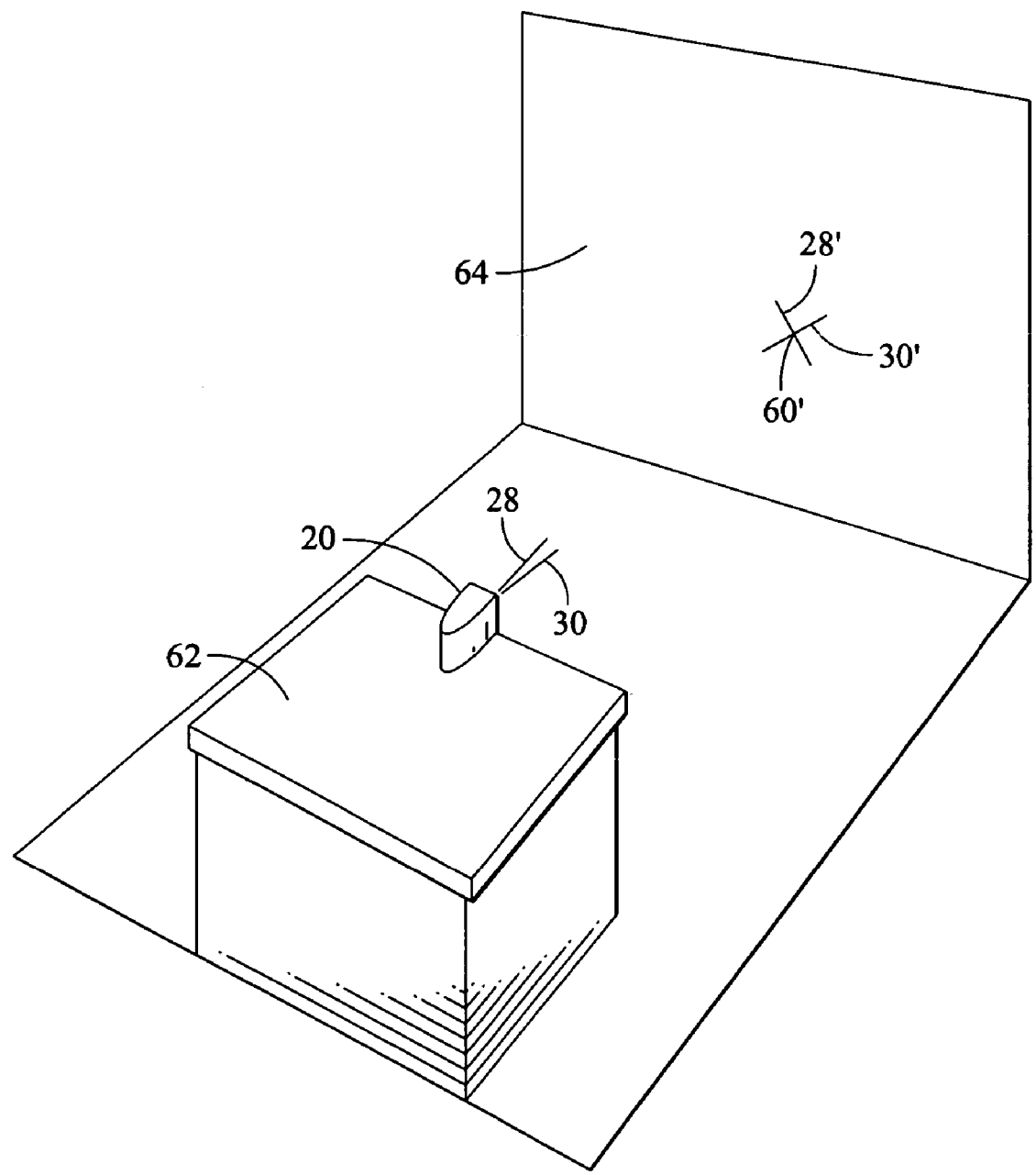
FIG. 4 is a left rear perspective view illustrating the first preferred embodiment being used to directly transfer a counter top height to the far side of a room.

The device 20 can be used to carry out several different tasks or applications. In a first example, the unit 20 can be used to transfer the elevation of the surface on which the device is placed to another location in the room without requiring any offset calculations to be made. This is useful in determining accurate countertop heights at other locations in a room. As shown in FIG. 4, the device 20 is placed on the edge of a countertop 62 in a room and turned on. The two fans of light 28 and 30 project across the room to wall 64. There, the two fans of light 28 and 30 create sharp lines 28' and 30' on the wall. Since the two fans cross each other, the lines on the wall form an "X", with the intersection of the two fans defining a point 60'. If the device 20 is properly calibrated, the point 60' will be substantially level with the bottom surface 58 of the device 20

Figure 5A:
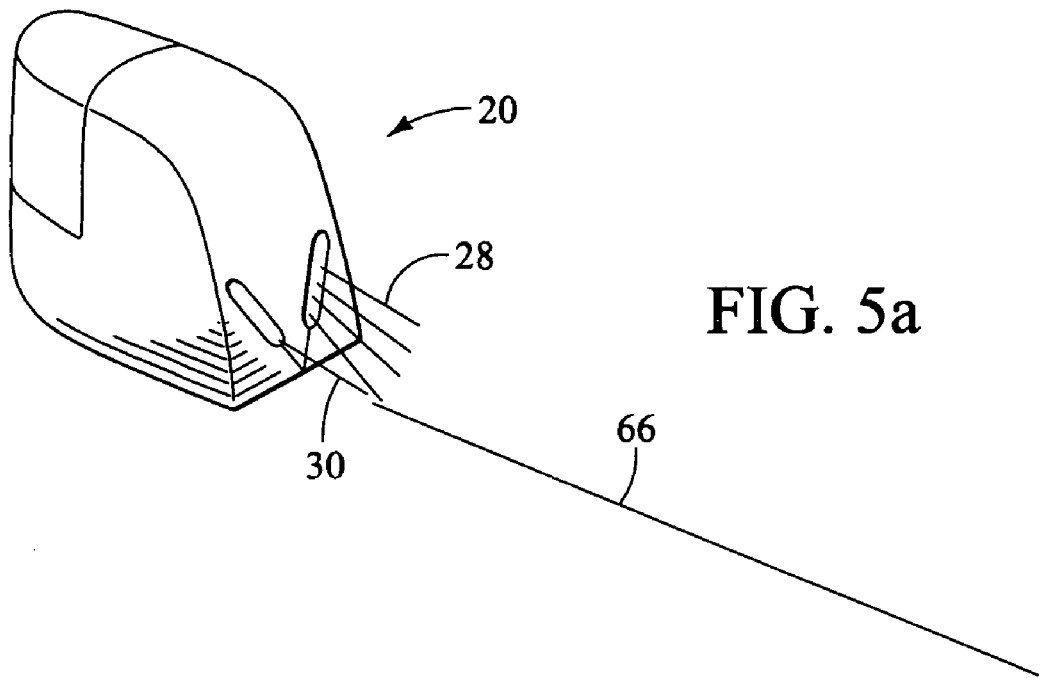
FIG. 5a is a left front perspective view of the first preferred embodiment operating on a level surface.

The device 20 is also capable of providing an intuitive visual indication of the level characteristics of a surface upon which the fans of light 28 and 30 are directed, and this is shown in FIGS. 5a, 5b, 5c and 5d. In FIG. 5a the device 20 is placed on a level surface, which results in the fans of light 28 and 30 impinging on the surface at the same line, thereby producing a single line 66 as shown. The observation of such a single line is a direct indication that the surface is level and also flat.

While it is preferred that the single line 66 be produced, it should be understood that for determine the level characteristics, if the bottom of the V configuration of the two fans of light do not intersect at the surface 58, each of the fans of light would not be superimposed on one another to produce a single line 66. However, they would produce two lines that would be parallel to one another if the subject surface is level and flat. Such a construction is considered to be within the scope of the present invention.

Figure 5B:
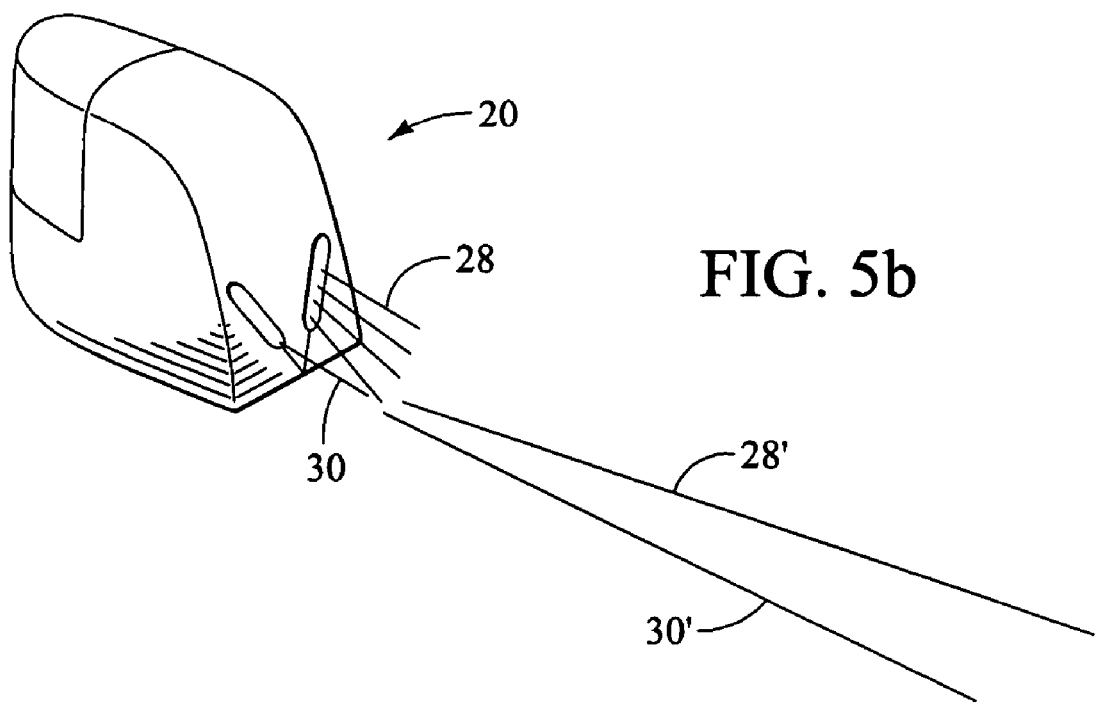
FIG. 5b, is a left front perspective view of the first preferred embodiment operating on an out of level surface.
Figure 5C:
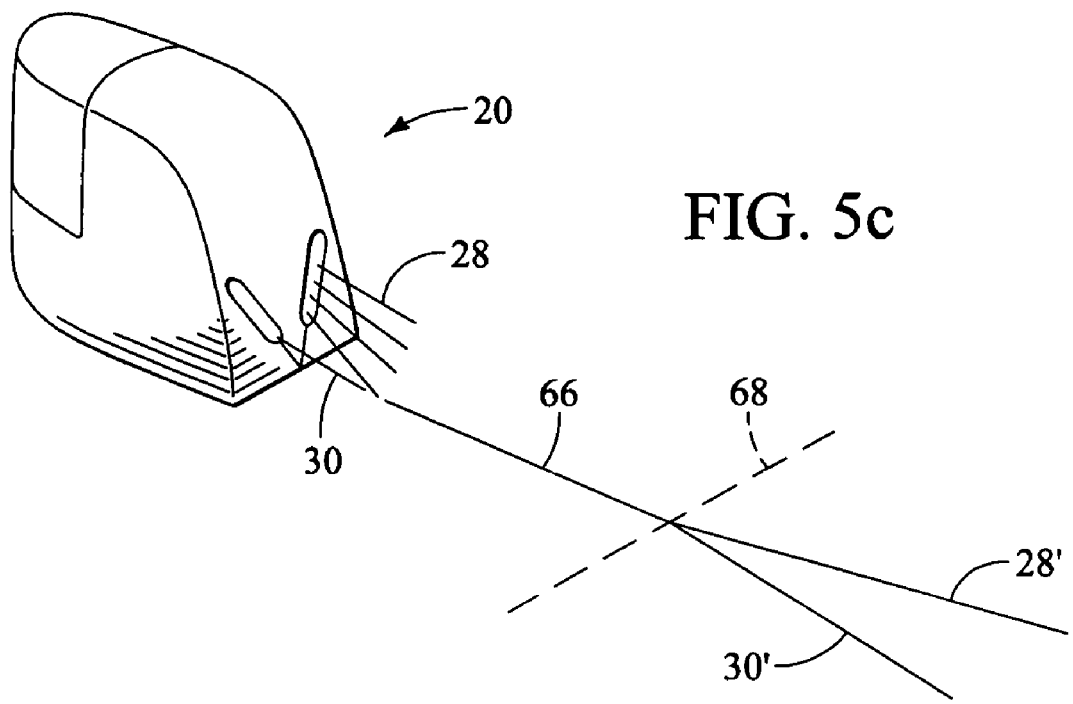
FIG. 5c is a left front perspective view of the first preferred embodiment operating on a partially level and partially non-flat surface.
Figure 5D:
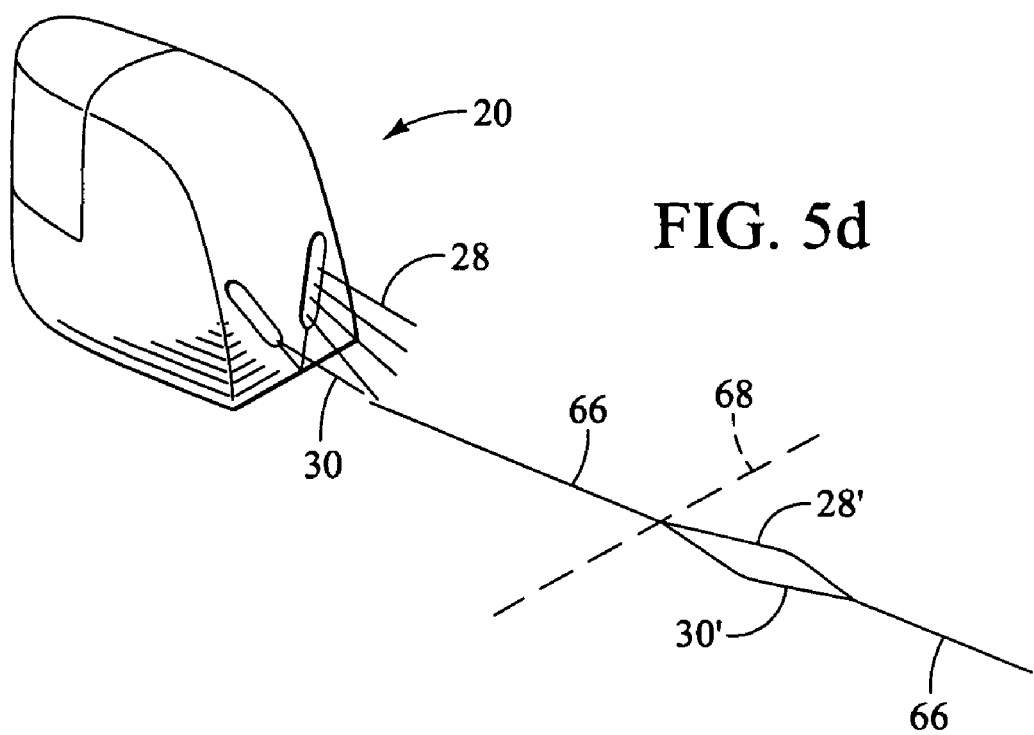
FIG. 5d is a left front perspective view of the first preferred embodiment operating on a generally level surface except for a small bump.

When the device is placed on a non-level surface as shown in FIG. 5b, the fans of light 28 and 30 intersect the surface along separate lines 28' and 30'. The observation of two distinct lines is a direct indication that the surface is not level. When the device 20 is placed on a partially level and partially non-level surface as shown in FIG. 5c, a variation of those shown in FIGS. 5a and 5b will be produced. In this example, the unit 20 is placed on a level surface, which is level from the unit to the line 68, but not level to the right of it. On the level portion, the fans 24 and 30 intersect on the surface forming a single line 66 as shown, but on the non-level portion of the surface the two laser lines diverge, forming laser lines 28' and 30'. In this manner the device 20 gives a direct indication of the portions of the surface that are level and flat, and the portions of the surface that are not level. This is further illustrated in FIG. 5d which has a single line 66 for most of the length the beams traverse across the surface, except for a small portion that has a localized area that is raised above the level surface, i.e., a bump. If the bump is not too pronounced, the height of the beams will be in continuous contact with the surface, and will produce divergent portions 28' and 30' where the bump exists and will then converge to a single line 66. This would enable an artisan to sand down the bump, for example, with the amount of divergence being reduced as the surface was flattened.

Figure 6A:
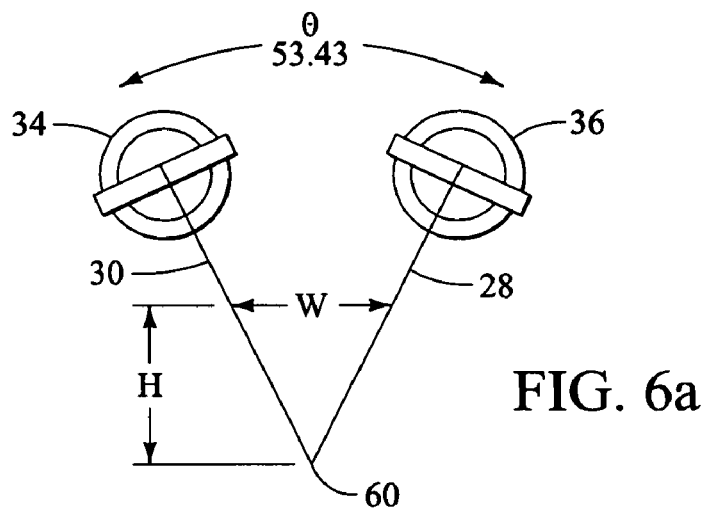
FIGS. 6a, 6b, and 6c are front views of the first preferred embodiment illustrating the laser beams being generated when the beams are set a various different angles.
Figure 6B:
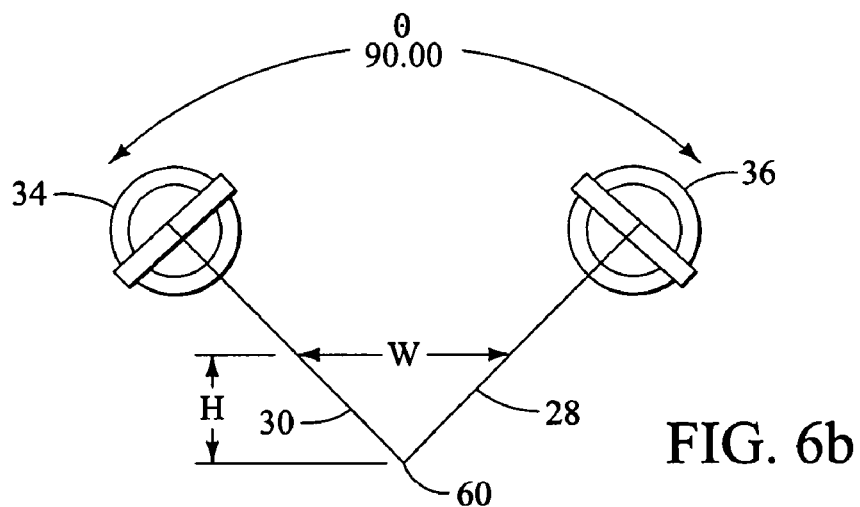
Figure 6C:
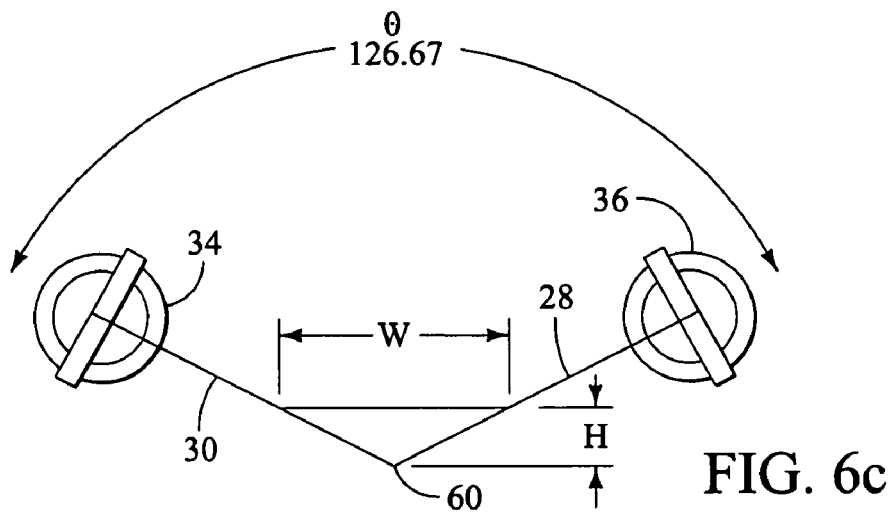

The size of the gap at any one location along the laser lines 28' and 30' is related to the extent of out of level of the surface and is also determined by the angle θ of the "V". FIGS. 6a, 6b, and 6c show several angles θ between the fans of light 28 and 30. In each case, however, the intersection of the two fans 28, 30 is coincident with the bottom surface 58 of the device 20 at point 60. It should be understood that the particular angle θ is determined by the height and separation of the of the line generators 34 and 36.

In FIG. 6a, the angle θ is approximately 53.13 degrees. This angle is preferred embodiment because the width W of the "V" is the same as the height H of the "V" as depicted. The net result for this is that the gap between laser lines 28' and 30' is precisely the vertical offset of the surface at any point of interest.

In FIG. 6b the angle θ is 90 degrees. This is significant because the width W of the "V" is twice the height H of the "V" as shown. In this case the gap between laser lines 28' and 30' will be precisely two times the vertical offset. This effectively doubles the sensitivity of the error measurement.

In general, any angle θ may be selected to get a desired sensitivity ratio. The larger the ratio, the more precise the indication is. For example, FIG. 5c depicts a "V" with a 4 to one ratio of W to H. In this example, a vertical error of 1 mm will be clearly visible as a 4 mm gap between the lines 28' and 30'.

It should be appreciated that an out of level condition will result in spaced apart lines 28' and 30' that diverge from one another regardless of whether the surface is rising or falling with regard to the bottom surface 58 of the unit. This is demonstrated in FIGS. 7a and 7b. In each example, the fans of light 28 and 30 impinge on the surface and produce diverging lines 28' and 30' on the surface, but different lines on the transverse surface of the target 70.

Figure 7A:
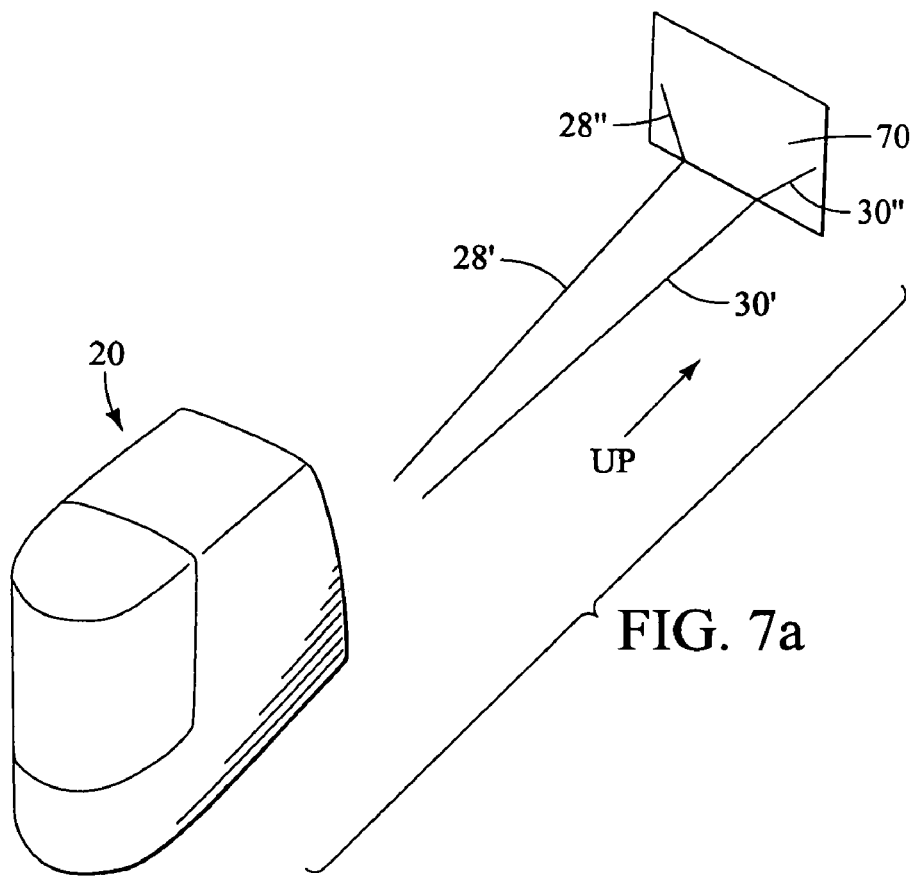
FIG. 7a is a left rear perspective illustrating the first preferred embodiment being used with a target and determining that the surface is low.

In FIG. 7a, the out of level surface rises with distance from the unit 20. In this circumstance, when the fans of light 28 and 30 hit the target 70, they produce diagonal lines 28" and 30" which extend outwardly from one another.

Figure 7B:
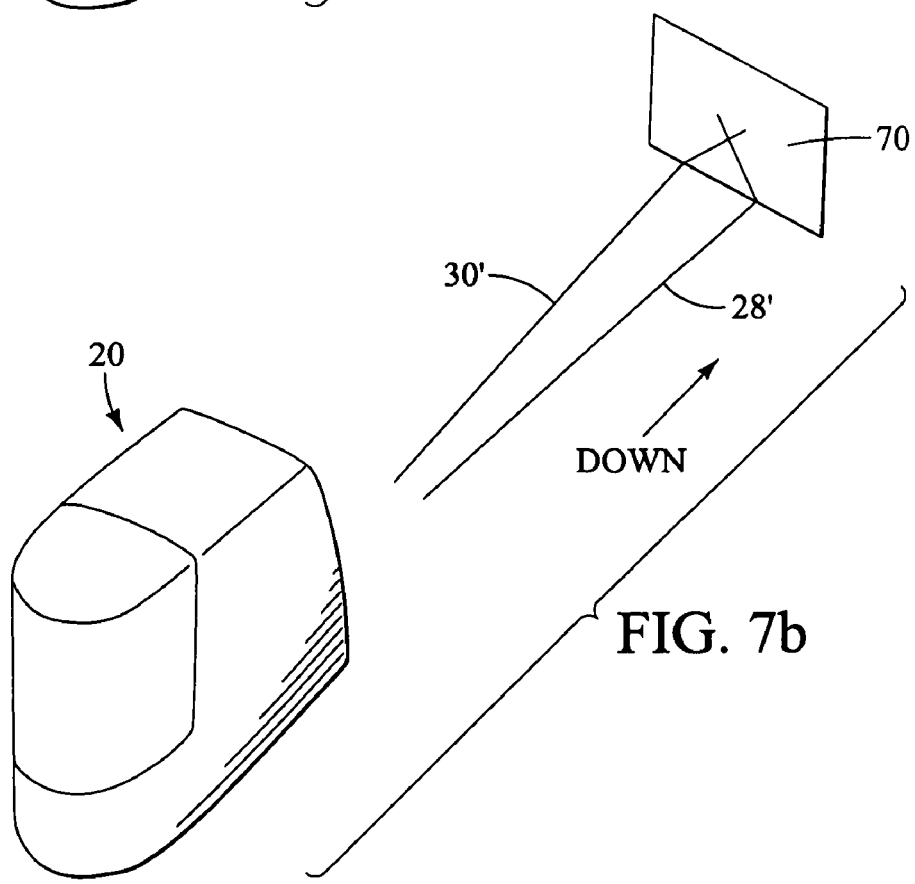
FIG. 7b is a left rear perspective illustrating the preferred embodiment being used with a target and determining that the surface is high.
Figure 8A:
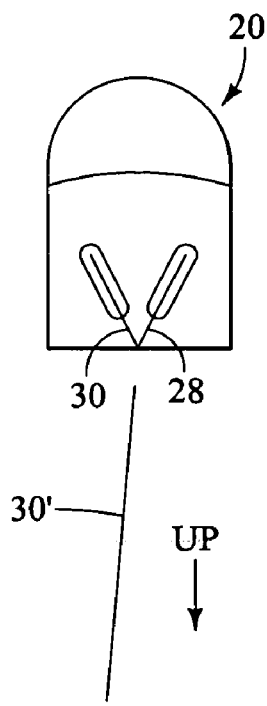
FIGS. 8a–8f illustrate a blinking sequence of the beams of the first preferred embodiment to help distinguish between a surface angled down and a surface angled up.
Figure 8B:
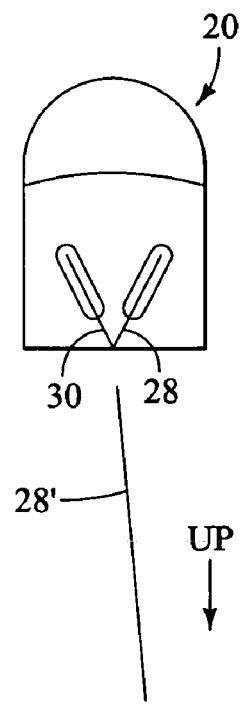
Figure 8C:
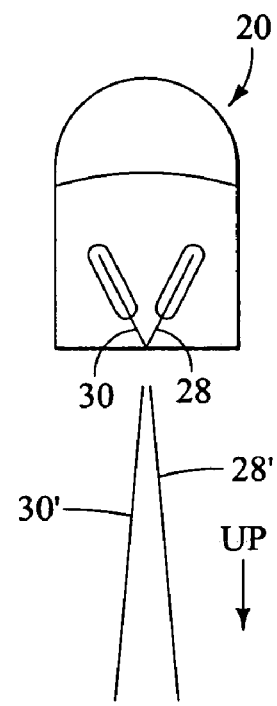
Figure 8D:
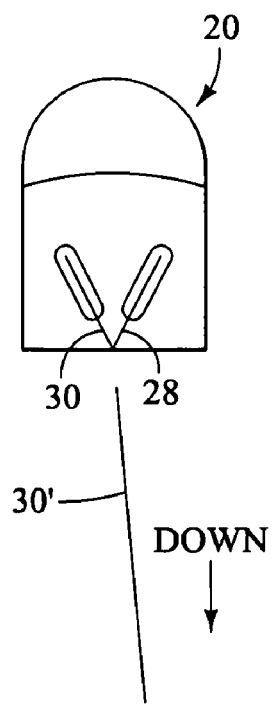
Figure 8E:
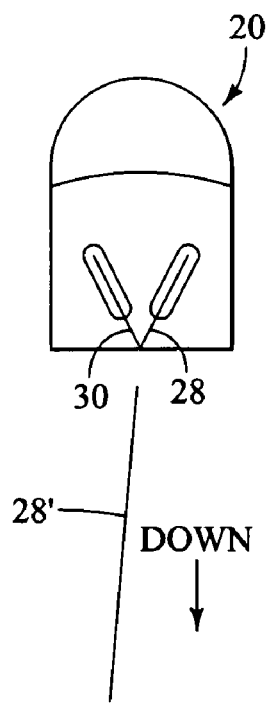
Figure 8F:
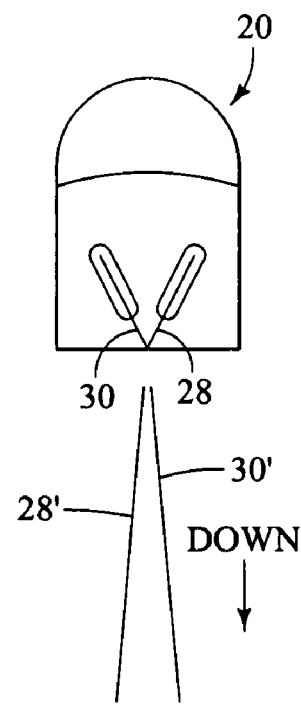

In FIG. 7b, the out of level falls with distance from the unit 20. In this circumstance, two lines 28' and 30' are formed on the surface, but while similar in appearance to that shown in FIG. 7a, the lines on the right (and the left) are produced by different beams relative to that shown in FIG. 7a. When these fans of light 28 and 30 intersect the target 70, the lines 28" and 30" angle towards each other forming an "X" as shown. Since the intersection of the "X" is along the level line, this gives a clear indication that the surface is below level. In this way the out of level up or down is clearly indicated.

The target 70 may be any partially reflective or scattering surface. A common target might be a scrap of wood being used as a shim. The thickness of the shim may be checked directly against the gap between the lines on the surface. As the shim is adjusted, the position of the "X" can be observed to verify at a glance when the surface is at the desired height.

Other methods may be employed to indicate if a surface is high or low. This may be accomplished by causing the lasers to blink in a simple known sequence. As shown in FIGS. 8a–8f, a blinking sequence of "right-left-both" may be employed. This sequence would produce the representation shown in FIGS. 8a, 8b, 8c for a surface that rises from the unit, and the representation shown in FIGS. 8d, 8e, 8f for a surface that lowers from the unit.

Figure 9A:
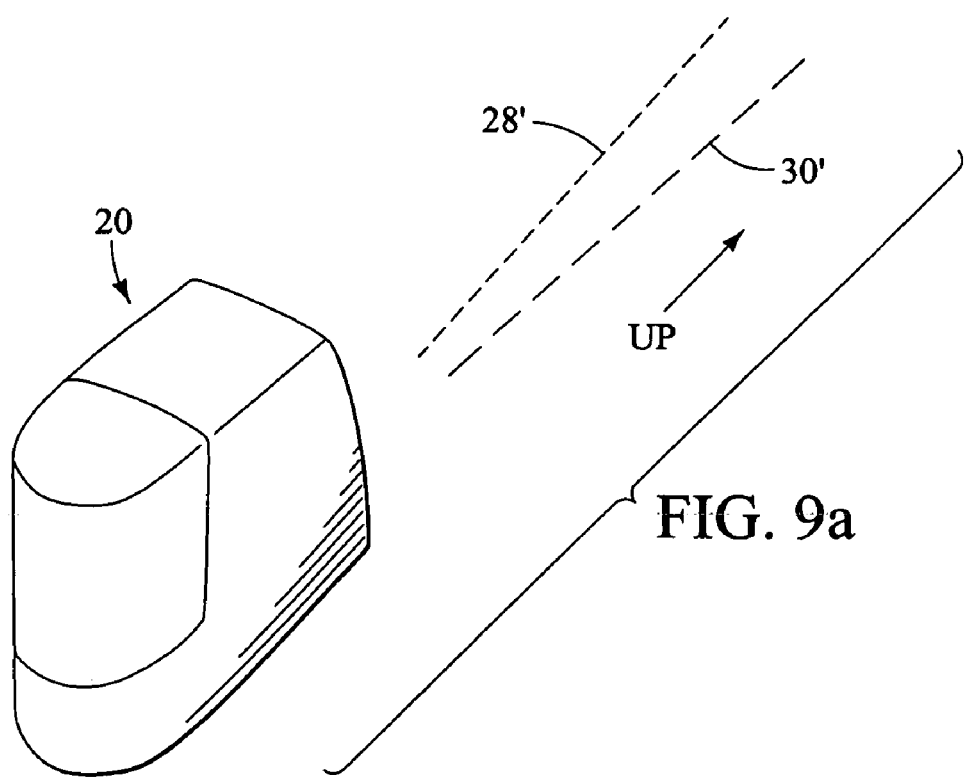
FIGS. 9a, and 9b illustrate a "dot-dash" differentiation of the beams to help distinguish between a surface angled downwardly from the device and a surface angled upwardly from the device.
Figure 9B:
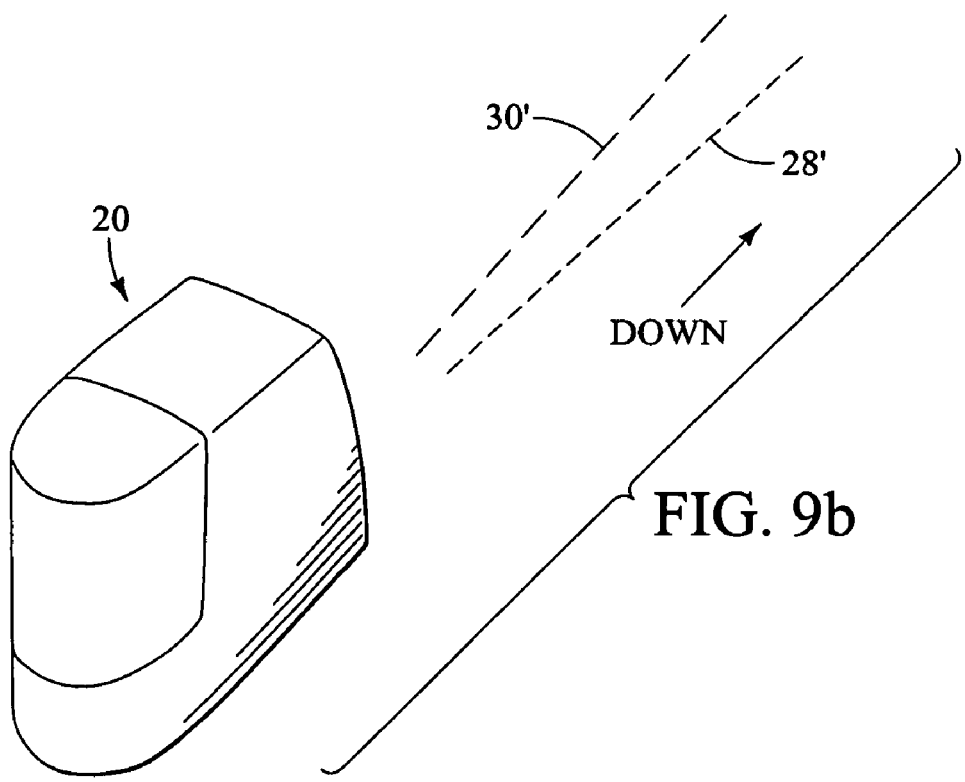

FIG. 9a illustrates a dot dashed differentiation of the fans of light 28 and 30 to help indicate a surface angled up. FIG. 9b is the same fans of light 28 and 30 impinging on a surface angled down. Such patterns are readily generated with holograms or diffractive elements. Such elements are also effective to enhance the brightness of the lasers.

Figure 10:
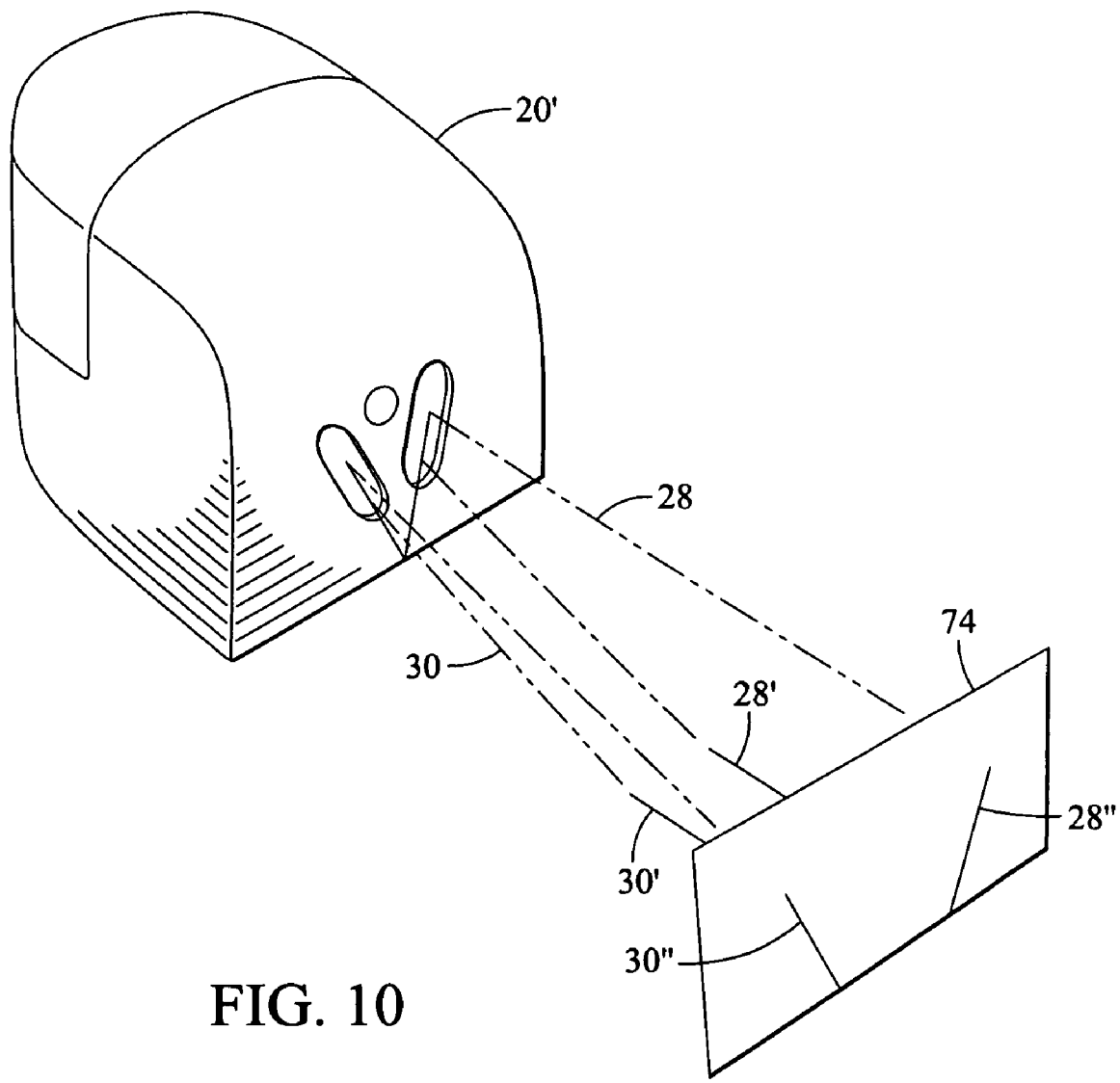
FIG. 10 is a left front perspective view of a second preferred embodiment of the invention which uses dithered lasers and a reflective target.

Other methods may be employed to enhance the visibility of the laser light. For example, a second preferred embodiment 20' is shown in FIG. 10 which uses line generators produced by dithered beams of light as is common with spinning laser products. The dithering may produce a shorter line. The shorter lines may be positioned only where they are needed. This concentrates the light, making it brighter, which can be more easily seen by a user. A third preferred embodiment may include a detector 72 located on the front of the housing or inside of the housing 22. When a retro reflective target 74 is used at the point of interest, much of the light will be reflected back to the housing. The reflected light may be detected by the unit 20' only when the dither position impinges on the target. The position of the dither can then be automatically adjusted to put all of the laser light in the vicinity of the target. This will increase the visibility of the lines 28" and 30" on the surface and target 74. A variety of electronic detectors could be employed to help in visualization or indication of the height variation.

Figure 11:
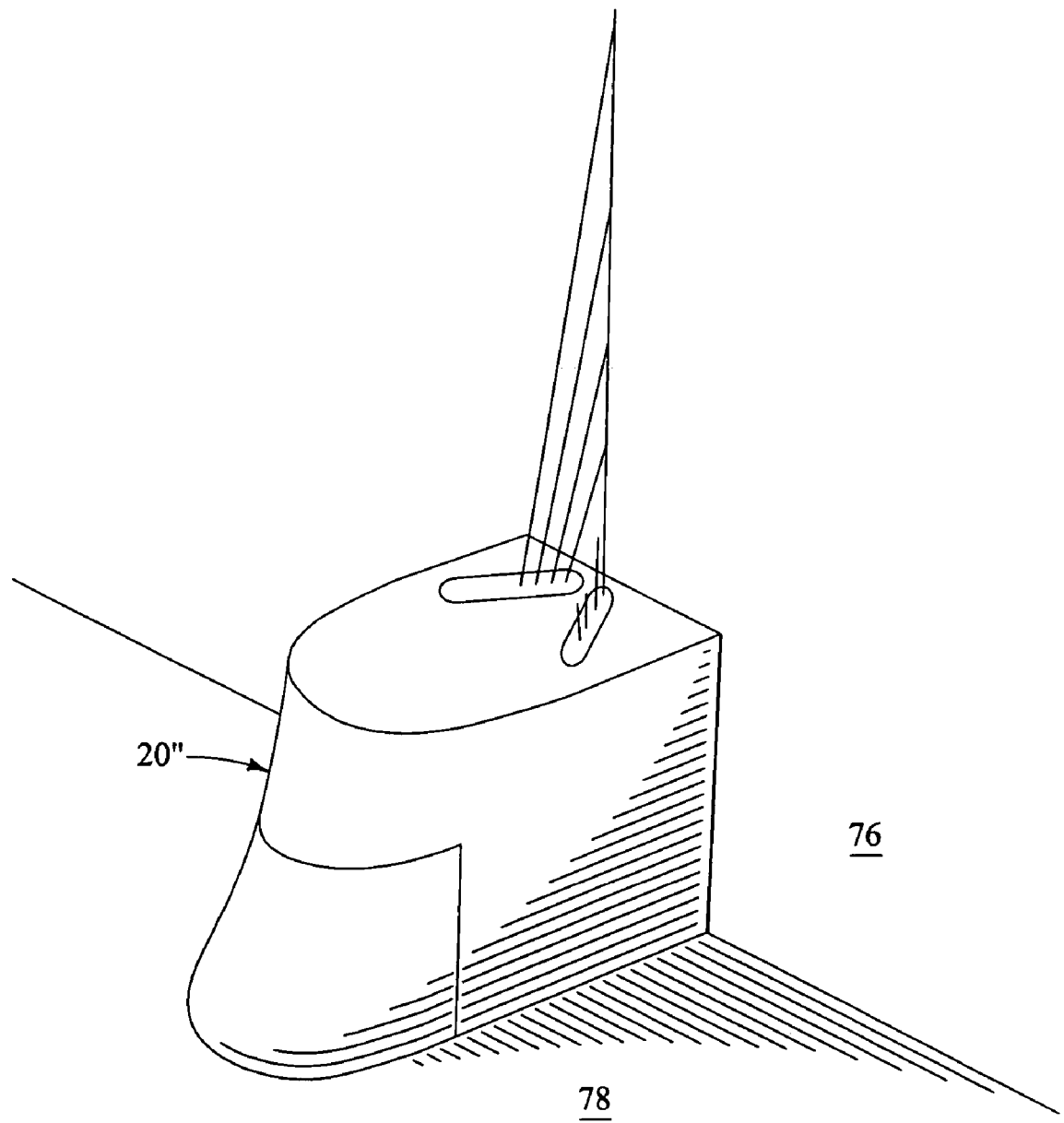
FIG. 11 is a perspective view of the first preferred embodiment of the invention shown in a plumb application.

A fourth preferred embodiment, indicated generally at 20" is shown in FIG. 11 and has a housing 22' that is configured plumb applications. The housing has flat surfaces that contact the wall 76 as well as the horizontal surface 78. Virtually all of the foregoing description generally applies to vertical surfaces, it being understood that the pendulum assembly needs to be configured to project the fans of light up a wall.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. An apparatus for providing a visual indication of level characteristics relative to a subject surface, comprising:
    a housing configured to be supported by a horizontal surface and having at least one opening for emitting light;
    a self-leveling assembly located in said housing;
    at least one laser source supported by said leveling assembly and configured to emit at least first and second laser fans of light that are directed onto the subject surface, said first and second laser fans of light being oriented at an angle relative to one another in a V shaped configuration relative to the subject surface, wherein the bottom of said V is located at a predetermined position relative to the subject surface.

2. An apparatus as defined in claim 1 further comprising a laser source for each of said first and second laser fans of light.

3. An apparatus as defined in claim 2 wherein each of said laser sources comprises a line generating laser and a cylindrical lens located at the output of said line generating laser configured to form a fan of laser light.

4. An apparatus as defined in claim 1 wherein the subject surface is said horizontal surface.

5. An apparatus as defined in claim 1 wherein the subject surface is a vertical surface.

6. An apparatus as defined in claim 1 wherein the angle of the V-shaped configuration of said fans of light is within the range of about 50° to about 130°.

7. A laser device as defined in claim 1 wherein said self leveling assembly is a pendulum assembly.

8. An apparatus for providing a visual indication of level characteristics relative to a subject surface, comprising:
    a housing configured to be supported by a horizontal surface and having at least one opening for emitting light and a flat bottom for resting on the subject surface, said predetermined position is on the subject surface;
    a leveling assembly located in said housing;
    at least one laser source supported by said leveling assembly and configured to emit at least first and second laser fans of light that are directed onto the subject surface, said first and second laser fans of light being oriented at an angle relative to one another in a V shaped configuration relative to the subject surface, wherein the bottom of said V is located at a predetermined position relative to the subject surface.

9. An apparatus as defined in claim 8 wherein said leveling assembly is a self leveling assembly.

10. An apparatus as defined in claim 9 further comprising a mechanism for damping said self-leveling assembly.

11. An apparatus for providing a visual indication of level characteristics relative to a subject surface, comprising:
    a housing configured to be supported by a horizontal surface and having at least one opening for emitting light;
    a leveling assembly located in said housing;
    at least one laser source supported by said leveling assembly and configured to emit at least first and second laser fans of light that are directed onto the subject surface, said first and second laser fans of light being oriented at an angle relative to one another in a V shaped configuration relative to the subject surface, wherein the bottom of said V is located at a predetermined position relative to the subject surface;

wherein at least one of said laser sources modulates its output to differentiate said fans of light from one another and wherein said laser sources are individually activated and simultaneously activated in a predetermined sequence.

12. An apparatus for providing a visual indication of level characteristics relative to a subject surface, comprising:

a housing configured to be supported by a horizontal surface and having at least one opening for emitting light;

a leveling assembly located in said housing;

at least one laser source supported by said leveling assembly and configured to emit at least first and second laser fans of light that are directed onto the subject surface, said first and second laser fans of light being oriented at an angle relative to one another in a V shaped configuration relative to the subject surface, wherein the bottom of said V is located at a predetermined position relative to the subject surface;

wherein the angle of the V-shaped configuration of said fans of light is selected to provide a known proportion of the distance between lines produced on the surface from said fans of light at any given location with the amount of deviation from level.

13. A laser device for providing a visual indication of the flatness of a surface, comprising:

a housing operatively supported by the surface;

a laser generating assembly for emitting at least a pair of fans of light that are directed onto a length of the surface, said fans of light being oriented in a V shaped configuration with the bottom of the V being located at a predetermined position relative to the subject surface and substantially parallel thereto;

said V shaped fans of light impinging on the surface and producing a pair of lines that are parallel to one another if the surface is flat and producing diverging lines if the surface is not flat.

14. A laser device as defined in claim 13 wherein said pair of parallel lines are superimposed on one another to appear as a single line if the surface is flat and said predetermined position is on the subject surface.

15. A laser device for providing a visual indication of the level characteristics and flatness of a surface, comprising:

a housing operatively supported by the surface;

a laser generating assembly for emitting at least a pair of fans of light that are directed onto a length of the surface, said fans of light being oriented in a V shaped configuration with the bottom of the V being located at a predetermined position relative to the subject surface; and a self-leveling mechanism in said housing for controlling said laser generating assembly so that said fans of light produce lines on the subject surface that are parallel to one another when the subject surface is level and flat.

16. A laser device as defined in claim 15 wherein said pair of parallel lines are superimposed on one another to appear as a single line if the surface is flat and said predetermined position is on the subject surface.

17. A laser device as defined in claim 15 wherein said leveling mechanism comprises a pendulum assembly that permits movement in at least one orthogonal horizontal direction.

18. A method of using a laser device to directly transfer the horizontal elevation of a surface to another location in a room without compensating for any offset, the laser device being of the type which has a self-leveling laser generating assembly for emitting a pair of fans of light oriented in a V shaped configuration with the bottom of V being located at the subject surface, comprising the steps of:

placing the device on the surface having the horizontal elevation that is to be transferred;

activating the device and directing fans of light to a vertical surface adjacent to where the horizontal elevation is to be transferred; and recording the location on the vertical surface where the fans of light cross one another.

* * * * *